United States Patent [19]

McAuliffe

[11] 4,099,105
[45] Jul. 4, 1978

[54] DIRECT CURRENT MOTOR CONTROL WITH PROTECTIVE LATCHING FEATURE

[75] Inventor: Gerald N. McAuliffe, Lincoln, Nebr.

[73] Assignee: Outboard Marine Corporation, Waukegan, Ill.

[21] Appl. No.: 771,159

[22] Filed: Feb. 23, 1977

[51] Int. Cl.² .............................................. H02P 3/00
[52] U.S. Cl. ..................................... 318/139; 318/459
[58] Field of Search .............. 318/139, 278, 346, 459; 307/10 BP, 130; 361/92, 194

[56] References Cited

U.S. PATENT DOCUMENTS

| | | | |
|---|---|---|---|
| 2,721,300 | 10/1955 | Myles | 361/92 |
| 3,376,467 | 4/1968 | Ree | 361/194 |
| 3,474,296 | 10/1969 | Rickey | 361/92 |
| 3,475,061 | 10/1969 | Steinkamp et al. | 307/130 |

*Primary Examiner*—Robert K. Schaefer
*Assistant Examiner*—Michael K. Mutter
*Attorney, Agent, or Firm*—Michael, Best & Friedrich

[57] ABSTRACT

Disclosed herein is a direct current motor control comprising a direct current motor, a solenoid switch including an actuating coil, a first lead connecting the drive motor and the solenoid switch in series relation to each other, a second lead connected to the motor and adapted to be connected to one terminal of a direct current source, a third lead connected to the solenoid switch and adapted to be connected to the other terminal of the direct current source, a sub-circuit assembly including the solenoid actuating coil and a solenoid coil actuating switch connected in series with each other, a fourth lead connected to the sub-circuit assembly and adapted to be connected to the one terminal of the direct current source, a solenoid latching switch connected to the sub-circuit assembly in series relation thereto and also connected to the third lead, a fourth lead connected to the sub-circuit assembly in series relation thereto and in parallel relation to the solenoid latching switch and also connected to the first lead, and a controller for regulating the rate of energization of the drive motor to control the speed thereof, for opening the solenoid coil actuating switch when the drive motor is de-energized, for closing the solenoid coil actuating switch and the solenoid latching switch in response to regulation of the motor at slow speed, and for opening the solenoid latching switch in response to regulation of the drive motor at a higher speed.

8 Claims, 2 Drawing Figures

U.S. Patent                  July 4, 1978                  4,099,105
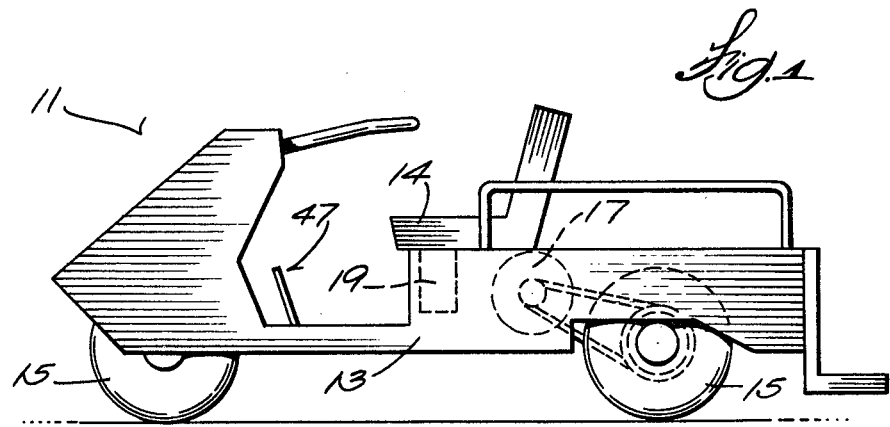
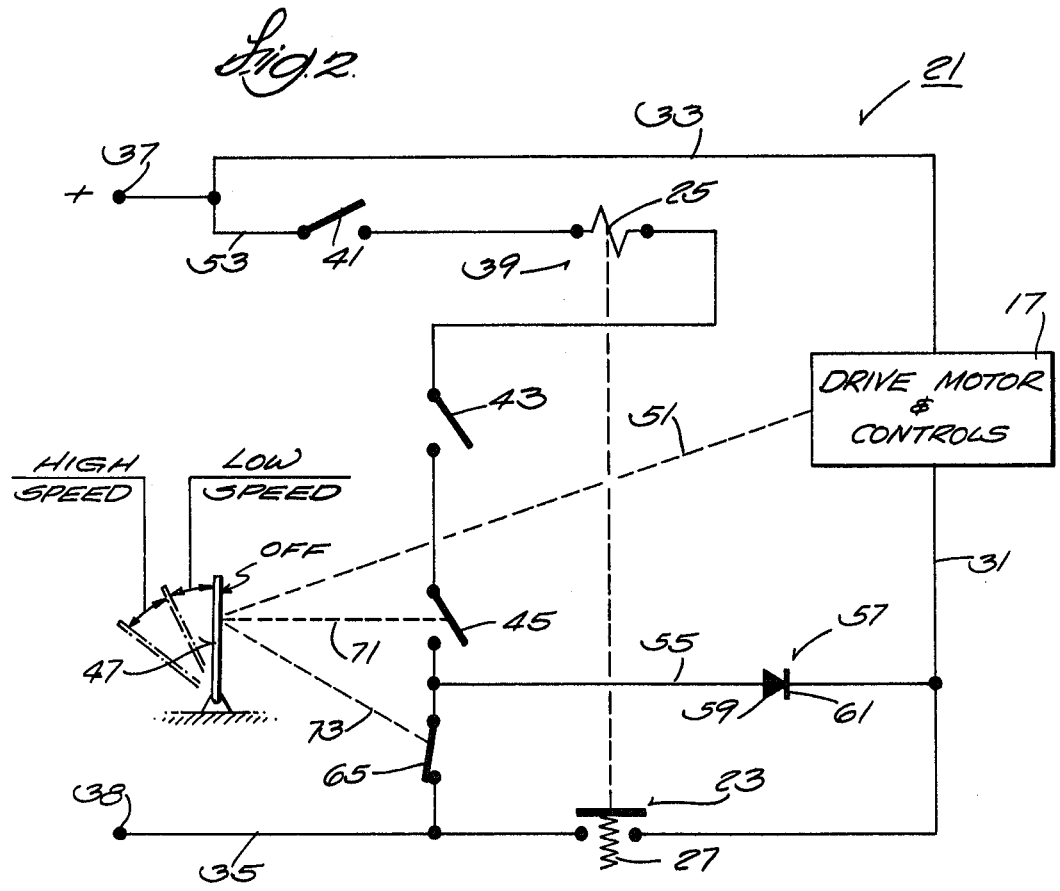

DIRECT CURRENT MOTOR CONTROL WITH PROTECTIVE LATCHING FEATURE

BACKGROUND OF THE INVENTION

The invention relates to vehicles driven by direct current electric motors. The invention also relates to controls for direct current electric motors. More particularly, the invention relates to circuits for controlling operation of direct current electric motors powering vehicles such as golf carts or light industrial vehicles.

SUMMARY OF THE INVENTION

The invention provides a direct current motor control comprising a direct current motor, a solenoid switch including an actuating coil, means connecting the drive motor and the solenoid switch in series relation to each other, means connected to the motor and adapted to be connected to one terminal of a direct current source, means connected to the solenoid switch and adapted to be connected to the other terminal of the direct current source, a sub-circuit assembly including the solenoid actuating coil and a solenoid coil actuating switch connected in series with each other, means connected to the sub-circuit assembly and adapted to be connected to the one terminal of the direct current source, a solenoid latching switch connected to the sub-circuit assembly in series relation thereto and also connected to the means connected to the solenoid switch and adapted for connection to the other terminal of the direct current source, means connected to the sub-circuit assembly in series relation thereto and in parallel relation to the solenoid latching switch and also connected to the means connecting the drive motor and the solenoid switch, and means for regulating the rate of energization of the drive motor to control the speed thereof, for opening the solenoid coil actuating switch when the drive motor is de-energized, for closing the solenoid coil actuating switch and the solenoid latching switch in response to regulation of the motor at slow speed, and for opening the solenoid latching switch in response to regulation of the drive motor at a higher speed.

In one embodiment in accordance with the invention, the sub-circuit assembly also includes a seat switch and an ignition switch in series relation to the series connection of the solenoid actuating coil and the solenoid coil actuating switch.

In one embodiment in accordance with the invention, the means for regulating the drive motor comprises a controller movable from an off position through a first speed position to a second speed position, which controller is associated with the solenoid coil actuating switch so that the solenoid coil actuating switch is open when the controller is in the off position and so that the solenoid coil actuating switch is closed when the controller is in the first and second positions, and which controller is associated with the solenoid latching switch so that the solenoid latching switch is closed when the controller is in the first position and so that the solenoid latching switch is open when the controller is in the second position.

One of the principal features of the invention is the provision of a control for a direct current motor, which control requires, in the event that current to the drive motor is interrupted when the motor has been operating at a relatively high speed, resetting of a speed controller to a relative low speed range in order to again initiate current flow to the drive motor.

Another of the principal features of the invention is the provision of a control for a direct current motor, which control will not permit energizing of the motor in the event a speed controller is set for relatively high speed operation.

Other features and advantages of the embodiments of the invention will become known by reference to the following general description, claims, and appended drawings.

THE DRAWINGS

FIG. 1 is a schematic view of a vehicle embodying various of the features of the invention.

FIG. 2 is a schematic view of a direct current motor control embodied in the vehicle shown in FIG. 1.

Before explaining the embodiments of the invention in detail, it is to be understood that the invention is not limited in its application to the details of construction and the arrangement of the components set forth in the following description or illustrated in the drawings. The invention is capable of other embodiments and of being practiced and carried out in various ways. Also it is to be understood that the phraseology and terminology employed herein is for the purpose of description and should not be regarded as limiting.

GENERAL DESCRIPTION

Shown in FIG. 1 is a vehicle 11 including a frame 13 which includes a seat 14 and which is supported on a set of wheels 15 driven by a direct current electric motor 17 which is electrically connectable to a source of direct current, such as one or more batteries 19, by a control circuit 21.

In FIG. 2, the control circuit 21 is schematically illustrated and the drive motor 17 is schematically illustrated in the form of a box which, in addition to representing the drive motor 17, also constitute a representation of any suitable speed control mechanism and/or reversing control mechanism.

Included in the control circuit 21 is a solenoid switch 23 which includes an actuating coil 25 and which is preferably biased to the open position by a spring 27 so that the solenoid switch 23 will be open in the absence of current flow in the actuating coil 25.

The solenoid switch 23 and the drive motor 17 are connected in series by suitable means in the form of a lead 31.

In addition, the drive motor 17 is connected to means in the form of a lead 33 which is adapted for connection to and which is shown connected to one terminal 37 of a source of direct current such as one or more batteries 19.

Still further in addition, the solenoid switch 23 is connected to means in the form of a lead 35 which is adapted for connection to and which is shown connected to the other terminal 38 of the source of direct current.

Also included in the control circuit 21 is a sub-circuit assembly 39 including the solenoid actuating coil 25, together with an ignition switch 41, a seat switch 43, and a solenoid coil actuating switch 45, all of which are connected in series. The ignition switch 41 is adapted to be opened and closed by an ignition key (not shown). The seat switch 43 is a normally open switch which is closed in response to receipt on the vehicle seat 14 of the operators weight. If desired, the ignition switch 41 and seat switch 43 can be omitted and various of the features of the invention can still be obtained.

The solenoid coil actuating switch 45 is movable between open and closed positions in response to operation of a controller 47 which is manually regulated by the operator. The controller 47 can be an accelerator pedal or a hand control and can also function as a part of the speed control mechanism associated with the drive motor. Thus, in the drawings the controller is shown schematically connected to the drive motor 17 by a suitable linkage 51 shown schematically in dotted line. In lieu of the linkage 51, the solenoid coil actuating switch 45 could be located in position for actuation by a part of the controller 47, or by any other suitable means.

More particularly, any controller 47 can be employed which is preferably movable from an off position through one or more positions in a low speed range and to one or more positions in a high speed range.

The sub-circuit assembly 39 is connected to means in the form of a lead 53 which is adapted for connection to and which is shown connected to the terminal 37 of the source of direct current.

In addition, means are provided in the form of a lead 55 connected to the sub-circuit assembly 39 and to the lead 31 connecting the drive motor 17 and the solenoid switch 23. Preferably, the lead 55 includes a diode 57 comprising an annode 59 connected to the sub-circuit assembly 39 and a cathode 61 connected to the lead 31 extending between the drive motor 17 and the solenoid switch 23.

In addition, there is provided a solenoid latching switch 65 which is connected to the sub-circuit assembly 39 in series relation thereto and in parallel relation to the lead 55 and which is connected to the lead 35 extending from the solenoid switch 23 to the other terminal 38 of the source of direct current. The solenoid latching switch 39 is movable between open and closed positions in response to operation of the controller 47.

More particularly, the solenoid latching switch 65 is connected to the controller 47 by a suitable linkage 73 shown schematically in FIG. 2 so that the solenoid latching switch 65 is closed when the controller 47 is in the off position or in any position in the low speed range and so that the solenoid latching switch 65 is open when the controller 47 is in any position in the high speed range. In lieu of the linkage 73, the solenoid latching switch 65 could be located in position for actuation by a part of the controller 47, or by any other suitable means.

Thus, in operation, assuming the ignition switch 41 is closed and the operator is seated on the vehicle seat 14 thereby closing the seat switch 43, when the controller 47 is in the off position, the solenoid actuating switch 45 is open, thereby preventing current flow through the solenoid actuating coil 25 and accordingly, the solenoid switch 23 is open, thereby de-energizing and preventing operation of the drive motor 17.

When the controller 47 is moved to any position within the low speed range, the solenoid actuating switch 45 is closed so as to complete a circuit through the solenoid actuating coil 25 and to thereby close the solenoid switch 23. It is particularly noted that current flowing through the solenoid actuating coil 25 can flow through the leads 55 and 31 and through the solenoid switch 23 to the terminal 38 as well as through the solenoid latching switch 65 to the terminal 38.

However, when the controller 47 is moved from the low speed range to any position in the high speed range, the solenoid latching switch 65 is opened thereby requiring the current flowing through the solenoid actuating coil 25 to also flow through the solenoid switch 23. Accordingly, any chattering or fluttering of the contacts of the solenoid switch 23 will break the current flowing in the solenoid actuating coil 25 and will thereby cause opening of the solenoid switch 23 and discontinuance of drive motor operation. In order to thereafter initiate drive motor operation, the controller 47 is repositioned into the low speed range in order to close the solenoid latching switch 65 so as to again permit energization of the solenoid coil 25 and accompanying closure of the solenoid switch 23 to permit operation of the drive motor 17.

The disclosed control operates such that, if the controller 47 unintentionally becomes stuck in a high speed position, or if the operator should locate the controller 47 in a high speed position before being properly seated, or if the operator should move the controller 47 to a high speed position before turning on the ignition switch 41, the drive motor will not operate until the controller 47 is returned to the low speed range, thus eliminating sudden and unexpected starts. In addition, because the current to the motor will be interrupted in response to fluttering of the solenoid switch 23, such interruption effectively warns the driver of deeply discharged batteries and thereby aids in avoiding damage to the batteries.

Various of the features of the invention are set forth in the following claims.

What is claimed is:

1. A direct current motor control comprising a direct current motor, a solenoid switch including an actuating coil, means connecting said drive motor and said solenoid switch in series relation to each other, means connected to said motor and adapted to be connected to one terminal of a direct current source, means connected to said solenoid switch and adapted to be connected to the other terminal of the direct current source, a sub-circuit assembly including said solenoid actuating coil and a solenoid coil actuating switch connected in series with said solenoid actuating coil, means connected to said sub-circuit assembly and adapted to be connected to the one terminal of the direct current source, a solenoid latching switch connected to said sub-circuit assembly in series relation thereto and also connected to said means connected to said solenoid switch and adapted for connection to the other terminal of the direct current source, unidirectional blocking means connected to said sub-circuit assembly in series relation thereto and in parallel relation to said solenoid latching switch and also connected to said means connecting said drive motor and said solenoid switch, and means for regulating the rate of energization of said drive motor to control the speed thereof, for opening said solenoid coil actuating switch when said drive motor is de-energized, for closing said solenoid coil actuating switch and said solenoid latching switch in response to regulation of said motor at slow speed, and for opening said solenoid latching switch in response to regulation of said motor at a higher speed.

2. A control in accordance with claim 1 wherein said unidirectional blocking means connected to said sub-circuit assembly and to said means connecting said drive motor and said solenoid switch comprises a lead including a diode having an annode connected to said sub-circuit assembly and a diode connected to said means connecting said drive motor and said solenoid switch.

3. A control in accordance with claim 1 wherein said sub-circuit assembly also includes a seat switch in series relation to the series connection of said solenoid actuating coil and said solenoid coil actuating switch.

4. A control in accordance with claim 1 wherein said sub-circuit assembly also includes an ignition switch mounted in series relation to the series connection of said solenoid actuating coil and said solenoid coil actuating switch.

5. A control in accordance with claim 1 wherein said sub-circuit assembly also includes a seat switch and an ignition switch in series relation to the series connection of said solenoid actuating coil and said solenoid coil actuating switch.

6. A control in accordance with claim 1 wherein said means for regulating said drive motor comprises a controller movable from an off position through a first speed position to a second speed position, said controller being associated with said solenoid coil actuating switch so that said solenoid coil actuating switch is open when said controller is in the off position and so that said solenoid coil actuating switch is closed when said controller is in the first and second positions, and said controller being associated with said solenoid latching switch so that said solenoid latching switch is closed when said controller is in the first position and so that said solenoid latching switch is open when said controller is in the second position.

7. A control in accordance with claim 6 wherein said controller is associtaed with said second latching switch so that said solenoid latching switch is also closed when said controller is in the off position.

8. A vehicle including a source of direct current having opposed terminals, a direct current motor, a solenoid switch including an actuating coil, a first lead connecting said drive motor and said solenoid switch in series relation to each other, a second lead connecting said motor to one of said terminals of said direct current source, a third lead connecting said solenoid switch to the other of said terminals of said direct current source, a sub-circuit assembly including said solenoid actuating coil, a solenoid coil actuating switch, a seat switch, and an ignition switch connected in series with one another, a fourth lead connected to said sub-circuit assembly and said one terminal of said direct current source, a solenoid latching switch connected to said sub-circuit assembly in series relation thereto and also connected to said third lead, a fifth lead connected to said sub-circuit assembly in series relation thereto and in parallel relation to said solenoid latching switch and also connected to said first lead, said fifth lead including a diode having an annode connected to said sub-circuit assembly and a diode connected to said first lead, and a controller movable from an off position through a first speed position to a second higher speed position, said controller being associated with said solenoid coil actuating switch so that said solenoid coil actuating switch is open when said controller is in the off position and so that said solenoid coil actuating switch is closed when said controller is in the first and second positions, and said controller being associated with said solenoid latching switch so that said solenoid latching switch is closed when said controller is in the first position and so that said solenoid latching switch is open when said controller is in the second position.

* * * * *